Aug. 28, 1951  W. J. PREISING ET AL  2,565,664
AUTOMATIC LOAD CONTROL FOR DISK HARROWS
Filed April 13, 1945  2 Sheets-Sheet 1

Inventor
William J. Preising
Charles T. Ray

By Walter W. Burns
Attorney

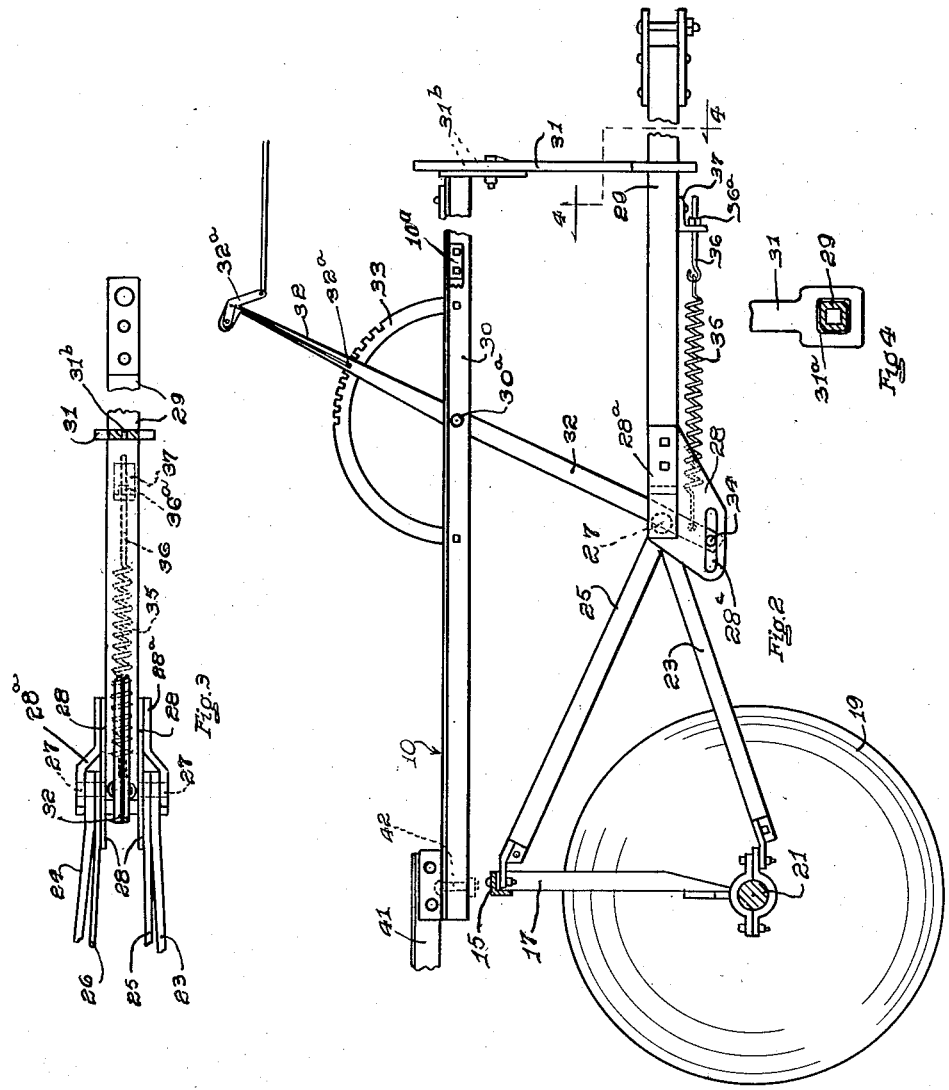

Patented Aug. 28, 1951

2,565,664

UNITED STATES PATENT OFFICE 2,565,664

AUTOMATIC LOAD CONTROL FOR DISK HARROWS

William J. Preising and Charles T. Ray, Louisville, Ky., assignors, by mesne assignments, to Minneapolis-Moline Company, a corporation of Minnesota Application April 13, 1945, Serial No. 588,108

17 Claims. (Cl. 55—83)

This invention relates to hitches and is particularly adapted for use with tractor and horse drawn disc earth working implements, such as harrows and the like.

The primary object of the invention is the provision of a hitch for horse and tractor drawn disc earth working implements such as harrows and the like wherein the load is predeterminedly set and thereafter automatically controlled to maintain the load substantially constant.

Another object of the invention is the provision of an improved traction controlled draft connection to a gang plow means wherein two draft connections are made to the gang in such a manner that the pull on the draft element will automatically control the angling of the gang to vary the load.

Still another object of the invention is the provision of an improved traction controlled draft connection to one or more gangs of a gang plow means wherein there are spaced connections between the draft element and the gangs to vary the angling from the differential between the backward pulls on the two connections.

Another and still further object of the invention is the provision of a draft hitch for gang plow means wherein the draft element is provided with two connections to a gang, one of which has a resilient member to operate to cause the draft to be lessened when the back pull of the gang on the draft element becomes greater than the desired maximum.

Other and further objects will be apparent to those skilled in the art from a reading of the complete specification.

Referring to the drawing wherein a preferred form of the invention is illustrated as applied to a disc gang harrow, Fig. 1 is a plan view of the invention applied to a disc harrow which is adapted for horse or tractor draft.

Fig. 2 is a side diagrammatic sectional view of the structure illustrated in Fig. 1, many parts being omitted for clearness.

Fig. 3 is a fragmental plan view of the load regulating mechanism.

Fig. 4 is a fragmental sectional view taken on the line 4—4 of Fig. 2.

Similar reference characters refer to the same or similar parts throughout the specification and drawing.

Figure 1:
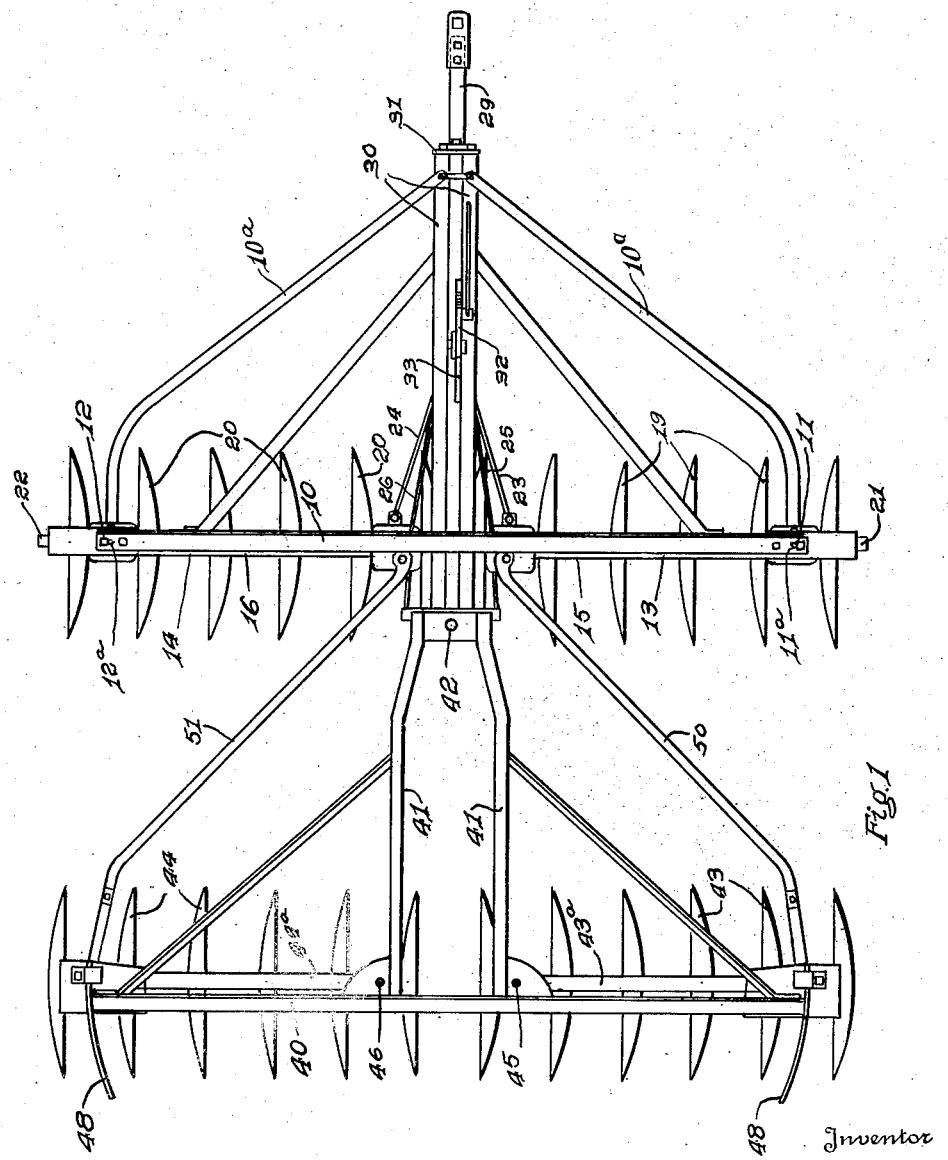

Referring particularly to Figs. 1 and 2, 10 represents the forward frame of the disc harrow and 40, the rear frame. Both the forward and rear frames, as illustrated, carry a pair of disc gangs, each of which is pivotally mounted on its frame to pivot in a substantially horizontal plane as will be later described. As the turning of the forward gangs is similar but usually opposite in direction to the rear gangs, the description of the operation of the invention will be first applied to the forward gangs, as illustrative of the operation of the invention.

The forward frame designated generally as 10 is provided with pivots 11 and 12 at the respective outer ends on which are vertically pivoted the respective outer ends of the gang frames 13 and 14. In the illustrated embodiment, the pivots 11, 12 have slotted connections 11a, 12a with the frames 13 and 14 respectively. Each gang comprises a top frame member, as 15, 16 which are provided with uprights 17. At the lower ends of the uprights 17 are pivoted the ends of the respective earth working disc elements which perform the harrow operations. These are designated as at 19, 20. The disc elements 19, 20 are pivoted on axles 21, 22. The inner ends of the axles move forwardly and rearwardly as desired, about vertical pivots 11, 12 as already described. The inner ends of the axles 21, 22 are pivotally connected to upwardly and inwardly extending links 23, 24. The inner ends of the frame members 15, 16 are pivotally connected with the rear ends of the downwardly extending link members 25, 26. The upwardly extending members 23, 24 and the downwardly extending members 25, 26 are all four, pivoted on a common axis as at pivots 27. The inner ends of the pivots 27 are mounted in a pair of plates 28 which are secured to the rear end of the draft element 29. The outer ends are mounted in straps 28a. The forward end of the draft element 29 is provided for connection to a tractor or with a tree to provide for animal traction.

The frame 10 has a pair of forwardly extending members 30 which at their forward extremity have an adjustable guide member 31 which is provided with a slide opening 31a through which passes the draft element 29. The draft element 29 moves freely within the opening 31a during operation, as will be described. The guide member 31 is provided with a series of holes 31b for use in attaching the guide 31 in any one of several adjusted positions to the forward end of the frame members 30.

Pivoted in the forwardly extending frame members 30, at 30a is an adjusting lever 32. This lever 32 is held in any one of many adjustable positions by a latch mechanism 32a which secures the lever to one of a series of notches arcuately arranged about the pivot 30ª on a guide 33. The guide 33 is secured to the forwardly extending frame members 30. The lower end of the adjusting lever 32, is provided with an integral pin 34 which has ends which extend into slots 28ᶜ of the plates 28, the ends of the slots, limiting the movement of the pin 34.

Connected to and near the lower end of the adjusting lever 32, is a spring 35 which extends forward and has, at its forward end, a hook 36. The hook 36 has a threaded end and is adjustably held in place by a suitable nut 36ª which engages one side of an angle iron 37 on the draft element 29, through which the hook passes. By adjusting the nut 36ª, the tension on the spring 35 may be varied.

The operation will now be described. By setting the lever 32 at the desired adjustment, the desired normal angle of the gangs with relation to the line of draft will be obtained which corresponds to the normal predetermined load which it is desired for the traction. This desired angularity is obtained by moving the upper end of the lever 32 forward if the inner ends of the forward gangs are to be moved to the rear—to produce greater draft—and when the upper end of the lever 32 is moved to the rear, the inner ends of the forward gangs are moved forward toward positions close to 90° to the line of the draft—to decrease the draft load. In this connection, it is well known that with this type of implement when the gangs are angled—by moving the inner ends to the rear, either by the lever 32 or by backing the machine, the penetration—and consequently the load—is increased, due to the cup shape of the discs and their deeper entry into the ground when the edge of the cup of the disc is presented to the ground surface at an angle to cut into the earth.

When the lever 32 is once adjusted, it becomes, while so adjusted, a rigid part of the frame 10, 30. When the draft is applied and the unit moves forward, the adjustment of the spring 35, by its threaded hook 36 and its nut 36ª, should be such that for the particular adjustment of the lever 32, all portions of the mechanism will be balanced. With the pull of the draft element directly on the inner ends of the gangs and the draft element pulling, through the spring 35 and its coacting mechanism, on the pivoted end of the gangs, the forces should be such that the pin 34 will be about mid-distance between the ends of the slots 28ᶜ.

At this point of the operation it is desired to direct particular attention to the two separate pulls exerted on the draft element 29. One connection from the draft element 29 passes through the plates 28, the pivot pins 27, the links 23, 24 and 25, 26 to the inner ends of the gangs 11, 12. This is a positive pull. The other pulling effort passes from the draft element 29, through the parts 37, 36ª, 36 and spring 35 to the adjusting lever 32 and thence through the frame 30, 10 to the pivots 11 and 12 to the outer ends of the gangs 11 and 12. Because of the action of the spring 35, this latter is a resilient pull.

As the harrow passes over the field with the parts in their desired setting and assuming an approximate maximum pull, any tendency for a greater pull will immediately have the effect of swinging the outer ends of the gangs relatively rearward. This action will immediately tend to bring the planes of the discs more nearly parallel to the vertical plane of the line of draft, and, as already pointed out, this action would decrease the necessary forward pull with the result that as soon as there is a tendency for the condition of the ground to make the traction heavier, an immediate compensation takes place to maintain the draft constant.

Consider now, the same normal conditions. Should the harrow plow discs run into soft ground there would immediately be a tendency for the spring 35 to pull the outer ends relatively forward which would present the edges of the cups of the discs in a better position to dig deeper into the soil. This would result in an increase of depth of entry into the ground with an increase of draft load, thus maintaining a constant load.

As these changes take place, the positions of the gangs change instantly so that the action is automatic and whether the load has a tendency to increase as when heavier ground is encountered, or to decrease as when soft ground is entered, this control mechanism reacts to correct the tendency and the draft load is maintained substantially constant.

By adjusting the handle of the hand lever 32 to a more forward position, a greater load is applied to the draft element 30. And by adjusting the handle of the hand adjusting lever 32 to a more rearward position, a lighter draft is brought about. It is to be understood in this connection that upon adjustment of the hand lever 32, the nut 36ª should be adjusted to cause the spring 35 to place the pin 34 at a substantially mid-position in the slot 28ª during normal operation.

The rear frame and gangs with their connections to the front frame and gangs will now be described.

A rear frame 40 having a forwardly extending portion 41, has a pivotal connection to the frame 10, at 42. Rear gangs 43, 44 are pivoted respectively at 45, 46 to the inner portion of the frame 40. At the outer portions of the frame 40 are guides 48 for contact with the frames 43ª, 44ª of the gangs 43, 44, as the gangs move about the pivots 45, 46.

At the outer ends of the gangs 43, 44 there are pivoted angling links or pull irons 50, 51. The forward ends of the angling links or pull irons 50, 51 extend inwardly toward the center of the harrow and are connected respectively to the inner ends of the gang frames 15 and 16 of the forward gangs 11 and 12. It will thus be clear that when the inner ends of the gangs 11 and 12 are forced rearwardly, the outer ends of the gangs 43 and 44 will be forced rearwardly. Since the cups of the forward discs face outwardly and the cups of the rear gangs 43, 44 face inwardly, the dirt will be thrown outwardly by the forward gangs and inwardly by the rear gangs.

While one modification of the invention has been described and illustrated in detail, it is to be understood that modifications and changes may be made without departing from the spirit of the invention and within its scope as claimed.

Having described the invention, what is claimed is:

1. A draft control mechanism for disc harrows comprising a frame, a draft element, means for mounting a disc gang for swinging angularly substantially in a horizontal plane, a positively adjustable lever mechanism for angling the disc gang and connections operated by the differential between the forward pull by the draft member and the rearward pull of the harrow to control the operation of the angling mechanism to move the connection in a direction to lessen the backward pull as the draft tends to increase and in the opposite direction to increase the draft as the draft tends to decrease said connections including a spring having its ends connected to the draft element and lever.

2. A draft control mechanism for a disc harrow comprising a frame, a pair of disc gangs swingingly and freely pivotally connected to the frame, the frame having a forwardly extending member, a draft element, a resilient connection between the draft element and forwardly extending member, including a spring member, a positive connection between the draft element and each of the gangs at points spaced from their respective swinging connections, one of the connections including a positively adjustable device connected to the resilient connection for coaction therewith, and stops coacting with both the resilient connection and the positively adjustable device for limiting the forward movement and rearward movement of the gang within predetermined limits.

3. A draft control mechanism for a disc harrow, comprising a frame, a pair of disc gangs, and means including a positively adjustable lever for swingingly connecting the discs to the frame, the frame having a forwardly extending member, a draft element, a resilient and adjustable connection between the draft element and forwardly extending member including an adjustable spring member, a positive connection between the draft element and each of the gangs at points spaced from their respective swingingly connecting means.

4. A draft control mechanism for a disc harrow comprising a frame, a pair of disc gangs and means including a positively adjustable lever for swingingly connecting the discs to the frame, the frame having a forwardly extending member, a draft element, guide means connecting the frame and draft element for keeping them in alinement with each other, a lever mounted on the forwardly extending member, spring means connecting the lever to the draft element and a positive connection between the draft element and each of the gangs and at points spaced from their respective swingingly connecting means.

5. A draft control mechanism for a disc harrow comprising a frame, a pair of disc gangs and means including a positively adjustable lever for swingingly connecting the discs to the frame, the frame having a forwardly extending member, a draft element, guide means connecting the frame and draft element for keeping them in alinement with each other, a lever pivotally mounted on the forwardly extending member and having means for securing the lever in any one of a plurality of adjusted positions, spring means connecting the lever to the draft element and a positive connection between the draft element and each of the gangs and at points spaced from their respective swingingly connecting means.

6. A draft control mechanism for a disc harrow comprising a frame, a pair of disc gangs swingingly connected to the frame, the frame having a forwardly extending member, a draft element, guide means connecting the frame and draft element for keeping them in alinement with each other, a lever mounted on the forwardly extending member, a latching means on the lever, a quadrant on the forwardly extending member in position for engagement with the latching means for locking the lever in any one of a plurality of adjusted positions, means connecting the lever to the draft element including a spring and a slot and pin connection, and a positive connection between the draft element and each of the gangs and at points spaced from the spring connecting means.

7. A draft control mechanism for a disc harrow, comprising a frame, a pair of disc gangs swingingly and freely pivotally connected to the frame, the frame having a forwardly extending member, a draft element, guide means connecting the frame and draft element for keeping them in alinement with each other, a connection between the draft element and frame including an adjustably locking hand lever and a resilient member controlled by the lever, a positive connection between the draft element and each of the gangs and at points spaced from the spring connecting means and stops coacting with both the hand lever and resilient member for limiting the forward and rearward gang movements within predetermined limits.

8. A draft control mechanism for a soil working implement, comprising a frame, a disc earth-working member swingingly connected thereto, a draft element, a resilient connection between the draft element and frame including a single adjustable locking hand lever and a resilient member controlled by the lever and a positive connection between the draft element and lever at a point spaced from the resilient connection and operative at a limit of relative movement between the lever and draft element.

9. A draft control mechanism for a soil working implement, comprising a frame, a disc earth-working member swingingly connected thereto, a draft element, a resilient connection between the draft element and frame including a single adjustable locking hand lever and a resilient member which is controlled by the said lever and a connection between the draft element and lever at a point spaced from the connection to the lever.

10. A draft control mechanism for a soil working implement comprising a frame, a disc earth-working member swingingly connected thereto, a draft element, two relatively movable connections from the draft element to, and for moving, the end of the earth-working member, one connection containing an adjustable resilient member, and a positively lockable hand adjustable means for varying the normal relative positions of the two connections.

11. A draft control mechanism for a soil working implement comprising a frame, a disc earth-working member swingingly connected thereto, a draft element, two relatively movable connections from the draft element for moving the earth-working member, one connection containing a resilient member, a positively lockable hand adjustable means between the connections for varying the normal relative positions of the two connections and means between the connections for limiting the relative movement between the two connections.

12. A draft control mechanism for disc harrows comprising a frame, a draft element, a positively adjustable lever mechanism between the draft element and frame for varying their normal relative positions, spaced connections between the discs and frame and between the discs and draft element to angle the discs when by the forward pull of the draft element, the relative positions of the frame and draft element change, the adjustable lever mechanism having stops for limiting the movement between the frame and draft element.

13. A draft control mechanism for disc harrow gangs comprising a frame, a draft element, a positively adjustable lever mechanism between the draft element and frame for varying their normal relative positions, a connection between the draft element and the gang, a second spaced connection between the gang and frame, the adjustable lever mechanism having a variably adjustable resilient connection to yieldably vary the angle of the gang relatively to the line of draft as the backward pull on the draft element varies with the changes in ground conditions.

14. A draft control mechanism for disc gang harrows comprising a frame, a relatively movable draft element, connections from the draft element and frame to the gangs at spaced points on the gang, positively adjustable lever means for initially setting the angle of the gang axis relative to the line of draft, and adjustable connections to the lever means and under control of the back pull of the harrow to cause relative movement between the draft element and frame to change the disc gang axis angle and thereby lighten the draft, and stop means for limiting the movement.

15. A draft control mechanism for disc gang harrows comprising a frame, a gang swingingly connected thereto, a draft element, a connection between the draft element and a point adjacent one end of the gang, a second connection between the draft element and gang, the connections to the gang being spaced apart, and a positively adjustable mechanism between the frame and draft means for simultaneously adjusting both limits of the swinging movement of the gang.

16. A draft control mechanism for disc gang harrows comprising a frame, a gang swingingly and freely pivotally connected thereto, a draft element, two connections between the draft element and the respective gang ends, one connection being direct and the other being through the frame, and a positively adjustable means between the frame and draft means for simultaneously adjusting the limits of the swinging movement of the gang relative to the draft element.

17. A draft control mechanism for disc gang harrows comprising a frame, a gang swingingly and freely pivotally connected thereto, a draft element mounted for relative movement to the frame in the line of draft, two connections between the draft element and the respective gang ends, one connection being direct and the other through the frame, and a positively adjustable means between the frame and draft means for simultaneously adjusting the limits of the swinging movement of the gang relative to the draft element.

WILLIAM J. PREISING.
CHARLES T. RAY.

REFERENCES CITED

The following references are of record in the file of this patent:

UNITED STATES PATENTS

| Number | Name | Date |
|---|---|---|
| 1,525,335 | Sutfin | Feb. 3, 1925 |
| 1,710,124 | Traphagen | Apr. 23, 1929 |
| 2,338,698 | White | Jan. 11, 1944 |

FOREIGN PATENTS

| Number | Country | Date |
|---|---|---|
| 253,566 | Great Britain | June 14, 1926 |